Aug. 26, 1969  J. L. JENNINGS  3,463,404

GAS BOUNDARY LAYER VARIABLE AREA ORIFICE

Filed Dec. 21, 1966  2 Sheets-Sheet 1

JOHN L. JENNINGS
*INVENTOR.*

BY *Steven F. Stone*

ATTORNEY

INVENTOR.
JOHN L. JENNINGS

United States Patent Office 3,463,404
Patented Aug. 26, 1969

3,463,404
GAS BOUNDARY LAYER VARIABLE AREA ORIFICE
John L. Jennings, Palos Verdes, Calif., assignor to United Aircraft Corporation, East Hartford, Conn., a corporation of Delaware
Filed Dec. 21, 1966, Ser. No. 603,502
Int. Cl. B23d 11/10; B05b 17/04
U.S. Cl. 239—418                1 Claim

ABSTRACT OF THE DISCLOSURE

A system for maintaining flow patterns through an orifice in line throttled liquid flow systems. An orifice is drilled through a porous member and pressurized gas is caused to flow inwardly through the porous member forming a boundary layer around the orifice. The boundary layer automatically adjusts the effective area of the orifice with changes in liquid flow rate caused by line throttling.

---

Figure 1:
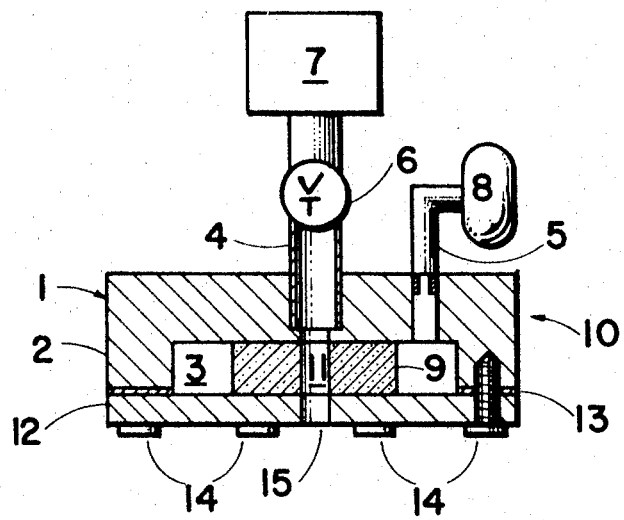

This invention relates to variable area orifices and more particularly to a system for automatically varying the effective orifice area in response to variations in liquid flow rate by means of a gaseous boundary layer. This invention is useful in any liquid flow system wherein it is desirable to maintain a predetermined spray pattern from an orifice through wide variations in liquid flow rate and is particularly useful in liquid and hybrid propellant rocket motors.

For example, rocket motors employing at least one liquid propellant can be throttled by varying the flow rate of propellant to the combustion chamber. It is desirable that propellant injected into the combustion chamber have a predetermined spray pattern to provide for intimate mixture and uniform combustion.

The simplest form of injector employs fixed area orifices and in such systems deep throttling of the propellant reduces the pressure drop ($\Delta P$) across the injector to the point where the desired spray pattern can no longer be maintained and the propellant merely dribbles or drips into the combustion chamber. Under such conditions the maintenance of stable combustion is extremely difficult if not impossible.

One approach to this problem is to employ variable area orifices wherein poppet or other valve means are used to decrease the effective area of the orifice in response to reduction in liquid flow rate, thereby maintaining a $\Delta P$ across the injector sufficient to produce the desired spray pattern. Such systems however, add additional weight, are subject to the deleterious effects of high temperature gases and are not readily adapted to use in complex injector structures employing a multiplicity of injector orifices.

Another approach has been to aerate the liquid propellant as described, for example, in U.S. Patents 3,272,770; 3,266,241; 3,257,800; 3,257,799 and 3,166,900.

Such systems inject a gas into the liquid which decreases the bulk density of the liquid to permit the maintenance of the desired spray pattern through fixed area orifices at low liquid flow rates. Such systems have been found to be generally satisfactory as long as separation of the liquid into discrete slugs of the aerated gas and liquid does not occur. Such separation causes a disruption of the spray pattern and produces unstable combustion.

According to the invention an orifice is provided in a porous member and gas is caused to flow through the body of the member into the orifice. The gas appears to form a boundary layer around the surface of the orifice, which automatically varies the effective area of the orifice in response to line throttling of the liquid. Thus at high flow rates the boundary layer causes a relatively minor constriction of the effective orifice area whereas at low flow rates substantial restriction occurs which is adequate to produce an injector $\Delta P$ sufficient to maintain a desired spray pattern.

It is accordingly an object of this invention to provide a variable area orifice having no moving parts.

It is another object of this invention to provide a liquid flow system wherein the effective orifice area is automatically varied in response to changes in liquid flow rate.

Figure 2:
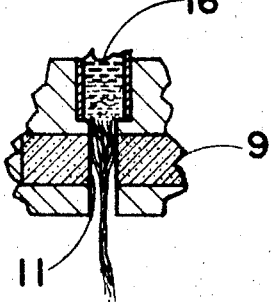
Figure 3:
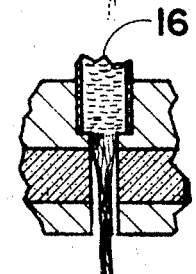
Figure 4:
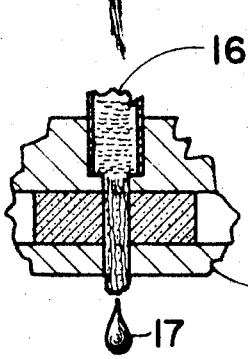
Figure 6:
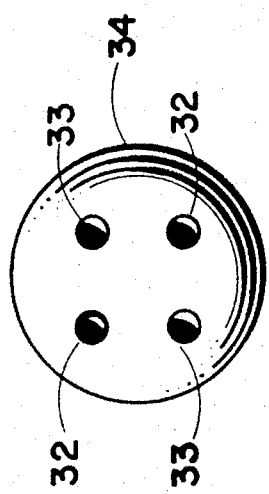
Figure 5:
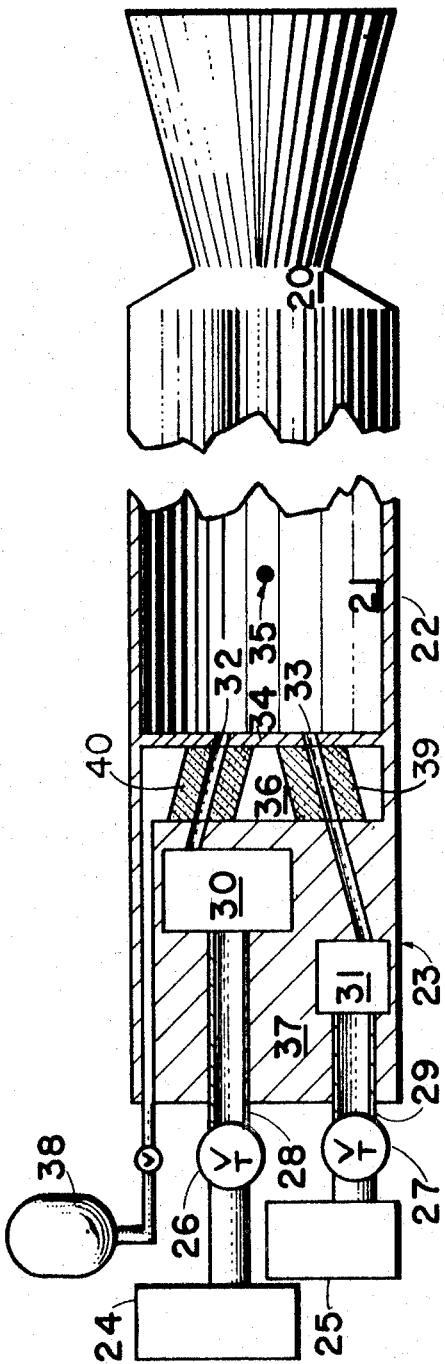

These and other objects of this invention will be readily apparent from the following description with reference to the accompanying drawings wherein:

FIG. 1 is a view partly in section of the liquid flow system of this invention,

FIG. 2 is a sectional view through an orifice according to this invention illustrating the flow pattern at one flow rate, FIG. 3 is a sectional view of the structure of FIG. 2 at increased flow rate, FIG. 4 is a sectional view of the structure of FIG. 2 at the same flow rate but without gas flow, FIG. 5 is a schematic view partly in section illustrating the use of this invention in a liquid propellant rocket motor, and FIG. 6 is a plan view of the face of the injector of FIG. 5.

Referring now to FIGURE 1, the apparatus of this invention comprises an injector 10 having a body portion 1 having an annularly disposed shoulder defining a central recess 3. Body portion 1 is provided with two ports, receiving fluid conducting means 4 and 5. Means 4 is connected through throttle valve 6 to a source of liquid 7 which is caused to flow from the source 7 through injector 10 by any suitable means such as pumps, pressurized tanks or gravity. Means 5 is connected to a source of pressurized gas 8 which supplies gas at a constant pressure to injector 10. A porous member 9 provided with a central opening or orifice 11 is mounted in recess 3 with opening 11 aligned with means 4 and is held in place by orifice plate 12 having orifice 15 aligned with orifice 11. Orifice plate 12 is secured to body 1 in fluid tight relationship by means of gasket 13 and circumferentially disposed screws 14. Orifice 11 is preferably of the same size as orifice 15 and is substantially smaller than the flow path within means 4. Thus orifice 11 is a constriction in the liquid flow line which contributes to the $\Delta P$ necessary for a desired spray pattern.

The porous member 9 may be selected from any suitable porous material such as porous metal, porous carbon, porous graphite, porous ceramics and porous cermets. In certain applications where corrosive materials are employed porous nickel or tungsten are particularly useful. In applications where large thermal stresses are encountered it may be preferable to fabricate the porous member from the same material as the injector itself. The porosity of the porous member, the gas pressure and the gas pressure drop across the member should preferably be selected so that the gas flowing into the member under the operating conditions forms a sheath around the liquid flowing through orifice 11. In this manner turbulence in the liquid is maintained at a minimum. However, satisfactory spray patterns have also been obtained when the fluid and the gas are admixed within the opening 11 in the porous member.

The porosity of porous members is generally expressed by manufacturers in terms of the flow rate through a porous member of a particular cross sectional area and thickness under a particular $\Delta P$ rather than in size of the pores. In designing any particular system the gas flow rate required to maintain the spray pattern at the lowest liquid flow rate is first determined. This may be done either empirically or on a trial and error basis. With this value and with the value of liquid pressure at maximum flow rate in mind it is possible to calculate the dimensions of the porous member and the gas pressure. The maximum liquid pressure should be known so that the gas pressure and ΔP of the gas through the porous member can be selected to prevent flow of liquid back through the body of the porous member under maximum liquid flow conditions.

The system designed for conditions at lowest liquid flow rate automatically adjusts itself at higher liquid flow rates. At higher liquid flow rates the gas flow through the porous member is reduced and the effective orifice area is increased. This effect can best be understood by reference to FIGURES 2, 3 and 4 which are representative of flow patterns under various conditions.

As an example of this invention a porous member 9 was fabricated from a porous sintered bronze disc, size 4-2 grade F-60 manufactured by Pacific Sintered Metals Company. A hole .0286" in diameter was drilled through the member 9. The liquid supply system provided variable water flow rates varying from a maximum of 0.4 gal./min. to a minimum flow rate of 0.01 gal./min. At the minimum flow rate the gas pressure was selected to provide a gas flow rate of 0.012 cu. ft./min. adjusted to standard conditions. This produced a pressure drop of 8 p.s.i. across the injector which was adequate to maintain the desired spray pattern for injection into a chamber at ambient conditions. As can be seen from FIG. 2 the liquid stream 16 at the low flow rate is strongly constricted and the effective orifice area is substantially less than the actual internal diameter of orifice 11. In FIG. 3 the flow pattern obtained by opening the throttle valve to permit greater liquid flow without changing the gas pressure is illustrated. The effective area of the orifice has automatically increased to accommodate the greater liquid flow.

FIG. 4 illustrates the flow pattern obtained with the same liquid flow rate as in FIG. 2, but with no gas flow. In this case the pressure drop across the injector was less than 1 p.s.i. and the liquid 16 accumulated on the orifice plate 12 until drops 17 collected and fell free.

Referring now to FIGURES 5 and 6 the use of the variable area orifice in a rocket motor is illustrated. A rocket motor 20 is shown having a combustion chamber 21 defined by casing 22. An injector 23 according to this invention is affixed to the forward end of casing 22 and is connected to source of liquid fuel 24 and liquid oxidizer 25 through throttle valves 26 and 27 and pipes 28 and 29. Injector 23 comprises an injector body 37 having a fuel manifold 30 and an oxidizer manifold 31 which distributes fuel and oxidizer to fuel orifices 32 and oxidizer orifices 33 extending through orifice plate 34. Orifices 32 and 33 are arranged to direct their streams to a common impingement point 35 as is known in the art. While two orifices for fuel and oxidizer are shown in the drawing it is recognized that any of the injector orifice patterns known to the art can be employed according to this invention. A gas manifold 36 is formed between orifice plate 34 and injector body 37 which receives pressurized gas from source 38. Porous members 39 and 40 are located within gas manifold 36 and are provided with ports aligned with orifices 32 and 33 respectively. In operation gas flowing inwardly through porous members 39 and 40 varies the effective orifice area automatically in response to changes in fuel and oxidizer flow rates determined by the setting of throttle valves 26 and 27 thereby maintaining the spray pattern necessary to produce impingement at point 35 at low liquid flow rates. Such a system permits throttling over a wide range of thrust levels. While this invention permits the maintenance of desired spray patterns at very low propellant flow rates, the lowest operationally feasible thrust level will generally be higher in order to avoid the necessity of carrying excessively large amounts of gas.

This invention has been described with respect to specific embodiments thereof. These embodiments are illustrative rather than limiting and various modifications thereof may be made without departing from the scope of this invention which is limited only by the following claim wherein I claim:

1. Apparatus for maintaining a pressure differential cross an injector orifice supplying reactive liquids to a combustion chamber at varying liquid flow rates comprising in combination:
   (a) a source of a first liquid,
   (b) a source of a second liquid capable of reacting exothermally with said first liquid,
   (c) separate liquid conducting means associated with each said sources of liquid, said means each having an upstream end and a downstream end, said upstream end being in fluid communicating relationship with its associated source of liquid and said downstream end having a constricted portion terminating in an injector orifice in fluid communicating relationship with said combustion chamber, the injector orifices associated with said first and second liquid being oriented with respect to each other to cause impingement in said combustion chamber of the first and second liquid streams emitted from said orifices, said constricted portion being of smaller internal flow path than upstream of said constricted portion,
   (d) a porous member in each said liquid conducting means surrounding said fluid flow path and forming at least part of said constricted portion adjacent to said injector orifice,
   (e) means for causing a pressurized gas to flow inwardly through each said porous member and into said flow path,
   (f) means for causing said first and second liquids to flow from the source of liquid through the associated injector orifice and into said combustion chamber, and
   (g) variable flow control means for regulating the flow rate of said first and second liquids at varying levels between full-on and full-off, said control means being located upstream of said constricted portion; whereby the flow of gas inwardly through each porous member automatically adjusts the effective area of flow through each injector orifice at various liquid flow rates.

References Cited

UNITED STATES PATENTS

| | | | |
|---|---|---|---|
| 2,692,800 | 10/1954 | Nichols et al. | 239—11 X |
| 2,957,306 | 10/1960 | Attinello | 138—45 X |
| 3,015,127 | 1/1962 | Stalego | 239—290 X |
| 3,078,047 | 2/1963 | Enemark | 239—590.3 X |
| 3,167,034 | 1/1965 | Oakes et al. | |
| 3,281,079 | 10/1966 | McAlexander et al. | 239—127.3 |

FOREIGN PATENTS

| | | |
|---|---|---|
| 694,918 | 7/1953 | Great Britain. |
| 795,651 | 5/1958 | Great Britain. |
| 795,652 | 5/1958 | Great Britain. |

EVERETT W. KIRBY, Primary Examiner

U.S. Cl. X.R.

138—45; 239—11 127.3, 265.11, 424.5, 426, 590.3